United States Patent Office 3,350,635
Patented Oct. 31, 1967

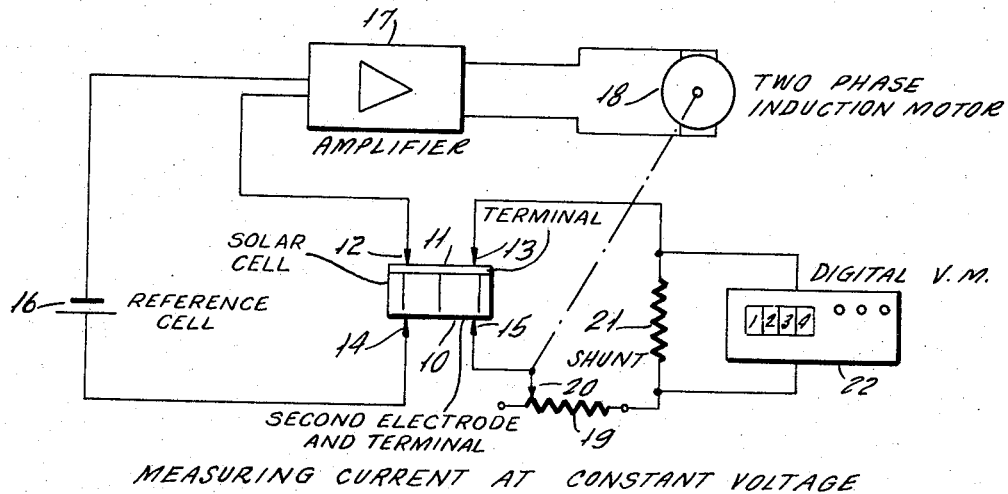
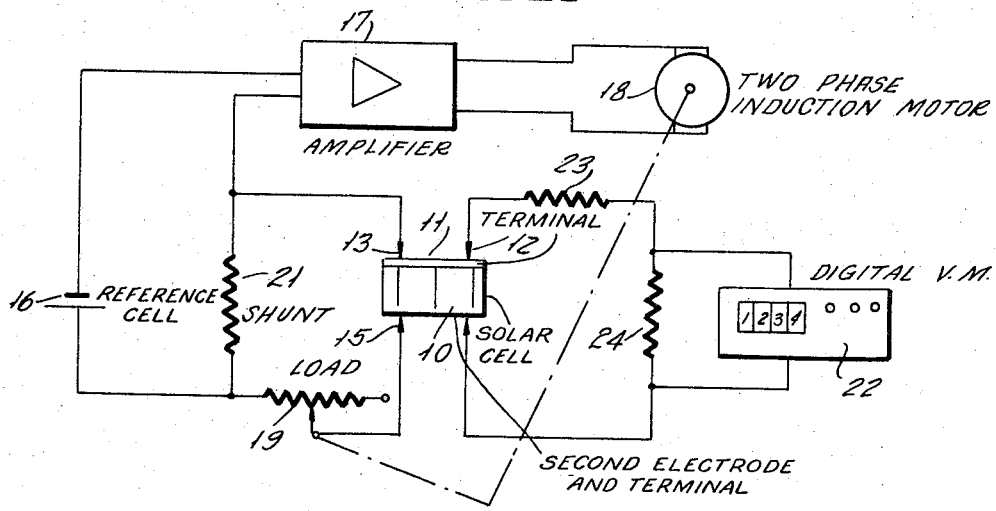

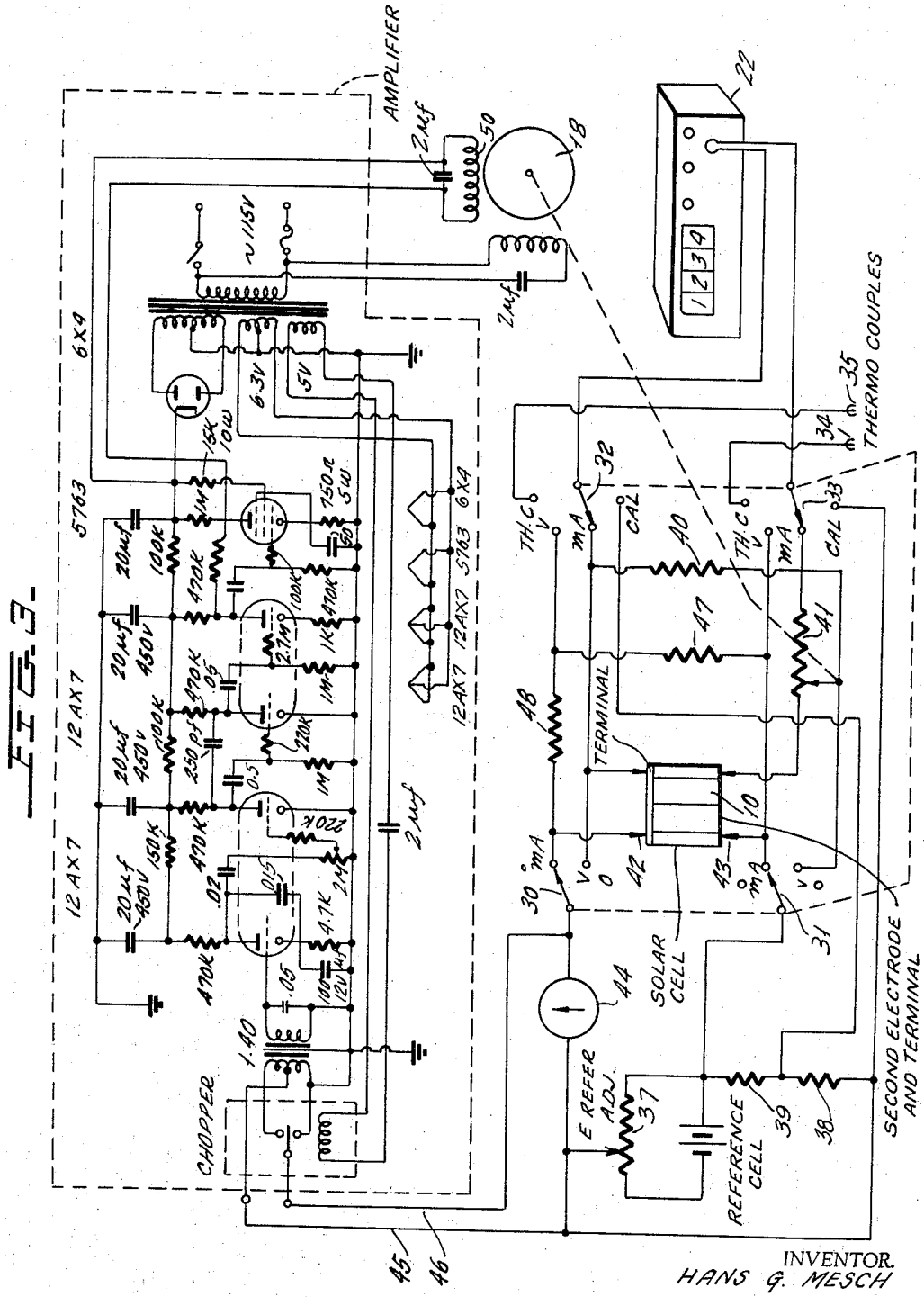

1

3,350,635
SOLAR CELL AND TEST CIRCUIT
Hans G. Mesch, Manhattan Beach, Calif., assignor to
International Rectifier Corporation, El Segundo, Calif.,
a corporation of California
Filed Apr. 1, 1963, Ser. No. 269,295
4 Claims. (Cl. 324—29.5)

This invention relates to a test circuit for solar cells and more specifically relates to a novel circuit means for maintaining one of cell voltage or cell current constant during the measurement of cell current or cell voltage respectively.

Photo-voltaic cells, hereinafter called solar cells, have families of characteristic curves which must be determined to permit the cell to be used in a particular application. Since both output voltage and output current are load sensitive and temperature sensitive, the determination of the characteristic curves is very time consuming. Moreover, variation of various parameters, when manually made, are not reproducible to high degrees of accuracy, and accuracy of measurement is limited since interpolation of meter readings is required.

The principle of the present invention is to provide a reference voltage or current in the test circuit which operates to vary impedance elements in the test circuit until voltage or current respectively is at a constant given by the reference value. In this way, one of the voltage or current is automatically brought to a predetermined constant value with the other parameter measured in an appropriate readout device.

With use of the novel test circuit of the invention, it has been found that 400 to 450 cells can be fully tested in one hour as compared to approximately 200 cells per hour by hand by a skilled technician.

Moreover, repeatability of measurement is made to within 0.027% as compared to 0.35% when using hand techniques. Also since the invention can use accurate electronic systems, it permits measurement with highly accurate meters whereby voltages can be measured to accuracies of ±0.000125 volt as compared to accuracies of ±0.0015 volt with hand techniques.

Accordingly, a primary object of this invention is to provide a novel automatic measuring circuit for solar cells.

Another object of this invention is to provide a measuring system for solar cells which can be operated by unskilled personnel.

A further object of this invention is to increase the accuracy of measurement of solar cell parameters.

Another object of this invention is to improve the repeatability of measurement of solar cell parameters.

Yet another object of this invention is to increase the speed of measurement of the parameters of a solar cell.

These and other objects of this novel invention will become apparent from the following description when taken in connection with the drawings, in which:

FIG. 1 shows a circuit diagram of the novel test circuit when output current is measured at constant voltage.

FIG. 2 shows a circuit diagram of the novel test circuit when output voltage is measured at constant current.

FIG. 3 shows a complete circuit diagram of the inventive circuit which can be switched between calibrating, constant voltage, constant current, and thermocouple modes of operation.

Referring first to FIG. 1, I have illustrated a top view of a typical solar cell 10 which has an electrode 11 on the upper surface thereof and a second electrode on the bottom surface (not shown) which serve as the terminals of the cell. Cell 10 can be any desired type photo-voltaic type device.

2

The test circuit includes a first probe, schematically shown by arrows 12 and 13 connected to electrode 11 and a second probe schematically shown by arrows 14 and 15 which are connected to the other electrode of the cell 10. A reference voltage source 16 which could be comprised of a mercury cell or any type of accurace D-C voltage device is then connected in series with cell 10 with opposing polarities for cell 10 and source 16 with the series connected cell and D-C source connected to the input of an appropriate amplifier 17. Amplifier 17 will then amplify the difference voltage between the output voltage of cell 10 and D-C source 16. The amplifier output which has a phase dependent on the polarity of the input signal and a magnitude proportional to the magnitude is then applied to one phase of a two phase induction motor 18 whereby the motor 18 will rotate in a direction dependent upon the polarity of the input signal to amplifier 17.

The output circuit of cell 10 includes the adjustable load resistor with the adjustable arm 20 being driven by motor 18. Thus rotation of motor 18 in a first direction will increase load resistance while rotation of motor 18 in an opposite direction will decrease load resistance.

A shunt resistor 21 is then connected in series with resistor 19 and cell 10 to provide a voltage drop on the input terminals of the digital voltmeter 22 which indicates the load current of the cell.

The circuit of FIG. 1 operates to measure the output current of the cell at constant voltage. Thus, D-C source 16 sets up some reference voltage. A source of illumination (not shown) is directed at cell 11 to cause an output voltage to appear across the cell. This output voltage is dependent in part on the value of load current and will assume some value. If this value is different from the predetermined value set by reference 16, a voltage difference input signal is applied to amplifier 17. The polarity of this input signal is such as to rotate motor 18 in a direction to adjust load resistor 19 to a load setting that will reduce the input error signal to amplifier 17 to zero. Thus, a first current reading can be taken rapidly for a given intensity level. The intensity level is then changed to a new calibrated value whereby output voltage and current of cell 10 change. However, the previously described operation quickly adjusts the load resistance to bring the output voltage to its predetermined level. This technique then continues until a curve which shows a junction of output current for variable intensity is obtained at some constant output voltage. Thereafter, the voltage reference 16 can be adjusted in any desired manner to obtain similar curves at different constant voltage levels.

FIGURE 2 illustrates the manner in which the circuit operates at constant current levels with output voltage being the variable parameter. In FIG. 2, components similar to those of FIG. 1 are given the same identifying numeral. In the circuit of FIG. 2, however, voltmeter 22 is arranged to measure the output voltage of cell 10 through the voltage divider arranged resistors 23 and 24. Moreover, reference source 16 is connected in series with shunt 21 and the input terminals of amplifier 17. Adjustable load resistor 19 and cell 10 are so connected to drive load current through shunt 21 in a direction opposite to the current from source 16. Therefore, when the current in load 19 differs from the predetermined value set by source 16 and shunt 21, an input signal appears on the input terminals of amplifier 17. Dependent upon the polarity of this input signal, motor 18 will rotate in the direction to alter load resistor to bring the error signal to zero. In this manner, the output voltage of cell 10 as measured by meter 22 can be quickly plotted as a function of light intensity.

FIG. 3 shows a complete test circuit which is operable in either of the modes of FIGS. 1 and 2 and additionally provide a calibration mode of operation and thermocouple connection position for easy measurement of operating temperature.

Four four-position ganged switches 30, 31, 32 and 33 are shown in FIG. 3. They are each movable to a thermocouple position (TH.C), a calibrating position (CAL), a current measuring position at constant voltage (ma.) and a voltage measuring position at constant current (V).

On switches 32 and 33 are operable in the thermocouple position and act to connect thermocouples 34 and 35, or equivalent temperature measuring device, to the input terminals of meter 22.

Thet D-C reference voltage source of FIG. 3 is comprised of a 1.34 volt mercury cell 36 which has a 2K potentiometer 37 connected thereacross to permit an adjustment of the reference voltage. The voltage of the reference can be measured by moving the switches to the calibrated position which connects 1K resistor 38 of the voltage divider including 99K resistor 39 to the input leads of meter 22.

For operation in the constant voltage mode switches 30–34 are placed in the "ma." position. A 0.1Ω resistor 40 is connected across the input of voltmeter 22 and corresponds to shunt 21 of FIG. 1. The adjustable load resistor is a 100Ω adjustable resistor 41 with the left hand portion of the resistor being inserted in the load current circuit. Probes 42 and 43 then connect the electrode of cell 10 in series opposition with the adjusted reference voltage drop on potentiometer 37 and a series connected null indicating instrument and impedance device 44. Instrument 44 deflects to the right or the left, depending on the polarity of an error signal. When the instrument indicates zero, a reading may be taken from voltmeter 22. Note that the voltage drop across instrument 37 is applied to the input conductors 45 and 46 of the amplifier 17 contained within the dotted block.

For operation in the constant current mode with output voltage being measured, switches 30–33 are placed in the V position. This places the 1K resistor 47 across the input terminals of meter 22 and corresponds to resistor 25 of FIG. 2. A 99K resistor 48 is also placed in the circuit and corresponds to resistor 23 of FIG. 2. Shunt resistor 40 is also connected in closed series relation with cell 10 and the left hand position of adjustable load resistor 41 whereby testing in the constant current mode proceeds as in FIG. 2. Note that null measuring instrument 44 operates to indicate a null when the desired current level is reached.

The amplifier 17 of FIG. 3 is shown in detail within the dotted line block and is seen to be of a type well known to those skilled in the art. Thus, input leads 45 and 46 are connected to an appropriate chopper which forms an A-C signal having a phase dependent upon the polarity of the input signal. This signal is then amplified in the second stages shown where the components have typical values labeled thereon. The output signal of amplifier 17 is then applied to winding 50 of the two phase induction motor 18, with the other winding 51 being energized from an A-C source.

The rotor of motor 18 will therefore rotate in a direction determined by the phase of the output voltage applied to winding 50 whereby resistor 41 will always be adjusted in a direction to decrease the input signal to amplifier 17 to zero.

The embodiments of the invention in which an exclusive privilege or property is claimed are defined as follows:

1. In combination, a test circuit and a solar cell; said solar cell having terminals; said test circuit comprising a first closed circuit connected in series with said terminals of said solar cell and a second closed circuit connected in series with said terminals of a solar cell; one of said circuits having a reference D-C source connected therein in opposing polarity with the voltage generated by said solar cell; the other of said circuits having an adjustable impedance connected therein; an amplifier having input and output terminals and a reversible motor connected to said output terminals of said amplifier; said amplifier input terminals connected in said one of said circuits whereby an input signal appears on said input terminals responsive to a voltage imbalance in said first circuit between said D-C source and said solar cell; said motor being mechanically connected to said adjustable impedance to thereby vary the value of said impedance until the voltage imbalance in said one of said circuits disappears; and a measuring instrument connected in circuit relation with said solar cell for measuring a variable parameter of said solar cell when said imbalance is eliminated.

2. The combination substantially as set forth in claim 1 which further includes switching means connected to said first and second circuits for switching said first and second circuits between a constant current mode of operation with output voltage being measured by said measuring instrument and a constant voltage mode of operation with output current being measured by said measuring instrument.

3. The combination substantially as set forth in claim 2 wherein said switching means has a switching position for selectively connecting said reference D-C source to said measuring instrument.

4. The combination substantially as set forth in claim 3 wherein said test circuit includes thermocouple measuring devices connected to said first and second circuits; said thermocouple measuring devices having ouput terminals; said switching means having a further switching position for connecting said output terminals of said thermocouple measuring devices to said measuring instrument.

References Cited
UNITED STATES PATENTS

| | | | |
|---|---|---|---|
| 2,367,746 | 1/1945 | Williams | 324—29.5 |
| 2,622,192 | 12/1952 | Tarpley. | |
| 2,697,191 | 12/1954 | Wannamaker et al. | |
| 2,724,022 | 11/1955 | Williams et al. | 324—30 X |
| 2,739,477 | 3/1956 | Vine | 324—30 X |
| 2,832,734 | 4/1958 | Eckfeldt | 324—30 X |
| 2,842,736 | 7/1958 | Heyd et al. | 324—30 |
| 2,863,115 | 12/1958 | Jackson | 324—30 |
| 2,886,770 | 5/1959 | Jackson et al. | 324—30 |
| 3,095,535 | 6/1963 | Jaffe et al. | 324—30 |

RUDOLPH V. ROLINEC, *Primary Examiner.*

F. M. STRADER, WALTER L. CARLSON, *Examiners.*

C. F. ROBERTS, *Assistant Examiner.*